(12) United States Patent
Ban

(10) Patent No.: US 9,172,560 B2
(45) Date of Patent: Oct. 27, 2015

(54) INFORMATION PROCESSOR, RECEIVER, AND INFORMATION PROCESSING METHOD

(71) Applicant: KABUSHIKI KAISHA TOSHIBA, Minato-ku, Tokyo (JP)

(72) Inventor: Koichiro Ban, Kawasaki (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 16 days.

(21) Appl. No.: 14/175,414

(22) Filed: Feb. 7, 2014

(65) Prior Publication Data

US 2014/0241413 A1 Aug. 28, 2014

(30) Foreign Application Priority Data

Feb. 27, 2013 (JP) ................. 2013-037672

(51) Int. Cl.
*H04L 27/00* (2006.01)
*H04L 25/02* (2006.01)
*H04L 25/03* (2006.01)

(52) U.S. Cl.
CPC ........ *H04L 25/0212* (2013.01); *H04L 25/0216* (2013.01); *H04L 25/03159* (2013.01)

(58) Field of Classification Search
CPC ............ H04L 25/0212; H04L 25/0216; H04L 25/022; H04L 25/03159; H04L 27/2695
USPC .................................................. 708/403–405
See application file for complete search history.

(56) References Cited

U.S. PATENT DOCUMENTS

2004/0021795 A1* 2/2004 Kim .............................. 348/607
2006/0120266 A1* 6/2006 Song et al. .................... 370/203
2006/0248135 A1* 11/2006 Cousineau et al. ........... 708/404
2007/0230580 A1* 10/2007 Kim et al. ................. 375/240.18
2009/0248774 A1* 10/2009 Chaudhuri et al. ........... 708/404

FOREIGN PATENT DOCUMENTS

JP 2004-241804 A 8/2004
JP 2009-206930 A 10/2009

OTHER PUBLICATIONS

Japanese Office Action (with English translation) dated Feb. 21, 2014 from Japanese Application No. 2013-037672, 6 pages.
Yang, et al.; "Improved Channel Estimation for TDS-OFDM Based on Flexible Frequency-Binary Padding", IEEE Transactions on Broadcasting, vol. 56, No. 3, Sep. 2010, pp. 418-424.

* cited by examiner

*Primary Examiner* — David B. Lugo
(74) *Attorney, Agent, or Firm* — Ohlandt, Greeley, Ruggiero & Perle, L.L.P.

(57) ABSTRACT

An information processor has a CIR estimator configured to estimate channel impulse response of an input signal including a channel estimation sequence and a data sequence, based on the channel estimation sequence, an extended CIR calculator configured to calculate extended channel impulse response based on the channel impulse response estimated by the CIR estimator so that an extended CIR element padded with zeros is repeated a plurality of times in the extended channel impulse response, a Fourier transformer configured to convert the data sequence of the input signal into a frequency domain signal to calculate frequency response based on the extended channel impulse response, and an equalizer configured to perform equalization for removing a distortion from a propagation channel, based on the frequency domain signal and the frequency response.

20 Claims, 9 Drawing Sheets

INFORMATION PROCESSOR, RECEIVER, AND INFORMATION PROCESSING METHOD

CROSS REFERENCE TO RELATED APPLICATIONS

This application is based upon and claims the benefit of priority from the prior Japanese Patent Application No. 2013-37672, filed on Feb. 27, 2013, the entire contents of which are incorporated herein by reference.

FIELD

Embodiments of the present invention relate to an information processor, a receiver, and an information processing method for estimating frequency response of each input frame including a channel estimation sequence and a data sequence.

BACKGROUND

In wireless communication, equalization is performed on the receiver side to remove intersymbol interference due to multipath propagation. As concrete techniques of the equalization, there are time domain equalization and frequency domain equalization. It is known that the frequency domain equalization is superior to the time domain equalization.

To perform the frequency domain equalization, it is required to provide FFT for performing frequency conversion on the channel impulse response of an estimated propagation channel and FFT for converting time domain data into frequency domain data, to perform equalization based on the output signal of each FFT.

Accordingly, the receiver requires computing circuits for two types of FFT, which leads to a problem of increase in circuit scale.

If one FFT is used to perform frequency conversion both on channel impulse response and data, which are different in the number of input bits to FFT, accuracy of frequency conversion performed by FFT may be deteriorated. For example, when the input bit width for FFT is optimized for data frequency conversion, the input bit width for FFT may possibly become insufficient depending on the effective length of channel impulse response, which leads to a problem that calculation accuracy of frequency response of channel impulse response is deteriorated.

DETAILED DESCRIPTION

According to one embodiment, an information processor has a CIR estimator configured to estimate channel impulse response of an input signal including a channel estimation sequence and a data sequence, based on the channel estimation sequence, an extended CIR calculator configured to calculate extended channel impulse response based on the channel impulse response estimated by the CIR estimator so that an extended CIR element padded with zeros is repeated a plurality of times in the extended channel impulse response, a Fourier transformer configured to convert the data sequence of the input signal into a frequency domain signal to calculate frequency response based on the extended channel impulse response, and an equalizer configured to perform equalization for removing a distortion from a propagation channel, based on the frequency domain signal and the frequency response.

The Fourier transformer has a plurality of calculation stages connected in cascade to calculate fast Fourier transform stage by stage, and the Fourier transformer calculates the frequency response by inputting the extended channel impulse response calculated by the extended CIR calculator into the calculation stage subsequent to an output node of the first calculation stage.

Embodiments will now be explained with reference to the accompanying drawings.

Figure 1:
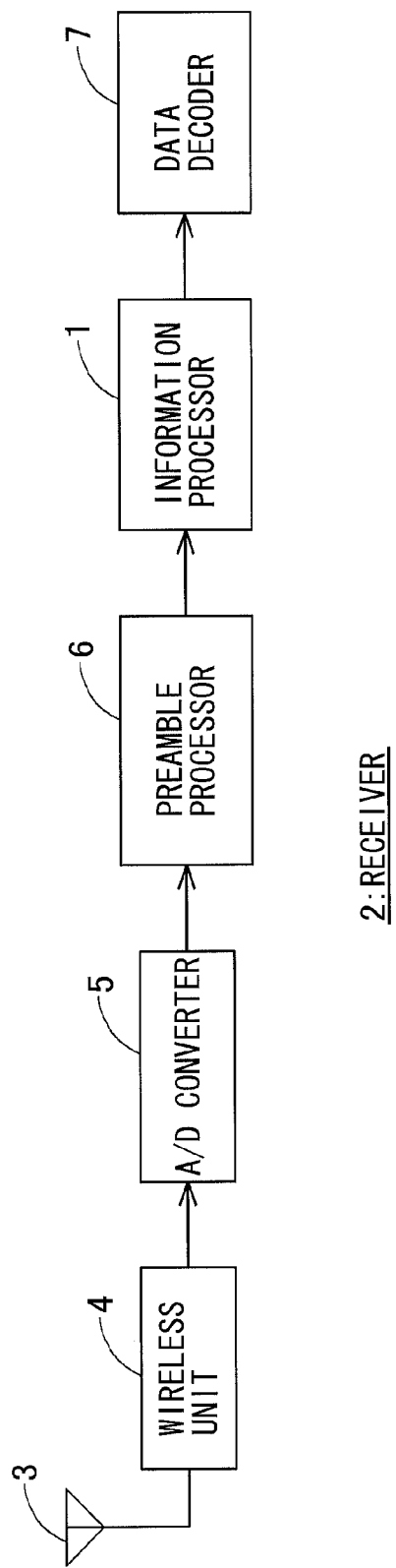
FIG. 1 is a block diagram showing a schematic structure of a receiver 2 having an information processor 1 according to the present embodiment.

FIG. 1 is a block diagram showing a schematic structure of a receiver 2 having an information processor 1 according to the present embodiment. The receiver 2 of FIG. 1 has a wireless unit 4 connected to an antenna 3, an A/D converter 5, a preamble processor 6, the information processor 1 according to the present embodiment, and a data decoder 7. The receiver 2 is based on SC-FDE (Single-carrier modulation with Frequency Domain Equalization) or OFDM (Orthogonal Frequency Division Multiplexing).

The wireless unit 4 performs amplification, frequency conversion, etc. on a high-frequency signal received by the antenna 3 to generate a baseband signal at baseband frequency. The A/D converter 5 converts the baseband signal outputted from the wireless unit 4 into a digital received signal. The preamble processor 6 processes the digital received signal on a frame-by-frame basis, to tune frequency and adjust gain based on a preamble in each frame. The information processor 1 to be explained later performs equalization on each frame. The data decoder 7 performs a predetermined decoding process to generate an unencoded signal.

Figure 2:
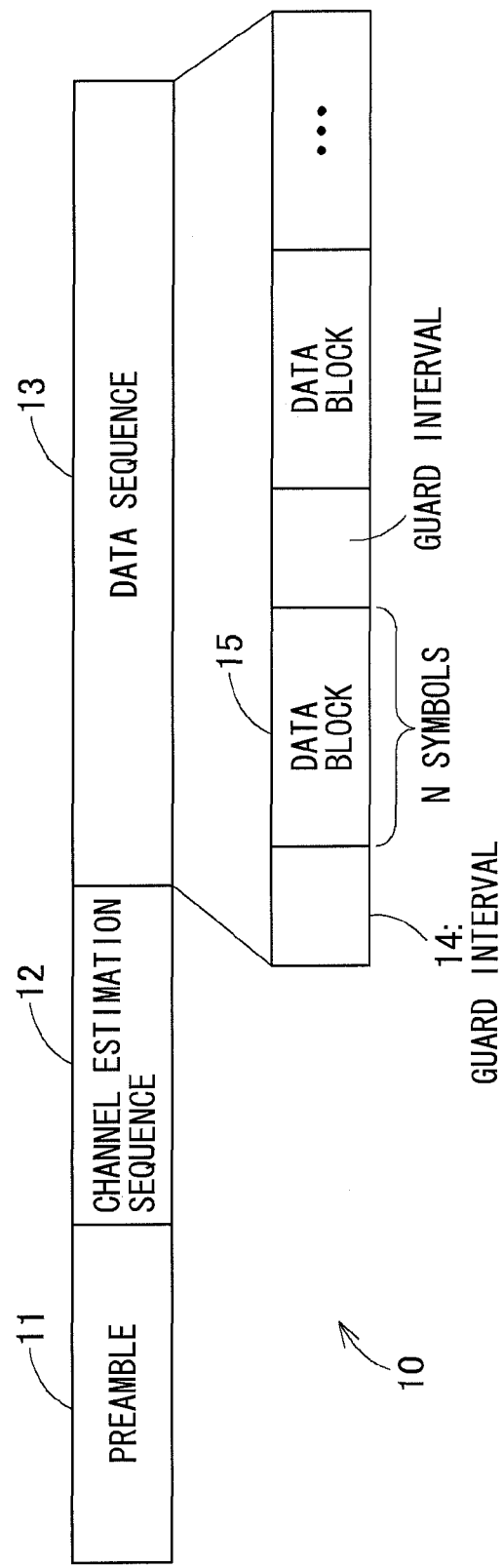
FIG. 2 is a diagram showing the structure of each frame 10 included in a digital received signal.

FIG. 2 is a diagram showing the structure of each frame 10 included in the digital received signal. As shown in FIG. 2, each frame 10 has a preamble 11, a channel estimation sequence 12, and a data sequence 13. The data sequence 13 is formed of guard intervals 14 and data blocks 15 alternately and repeatedly arranged, each data block 15 consisting of N symbols. The guard interval 14 uses mainly a sequence obtained by cyclically extending a known data sequence or data block. Note that the guard interval 14 may be omitted from the frame (that is, the number of symbols in the guard interval may be 0).

Figure 3:
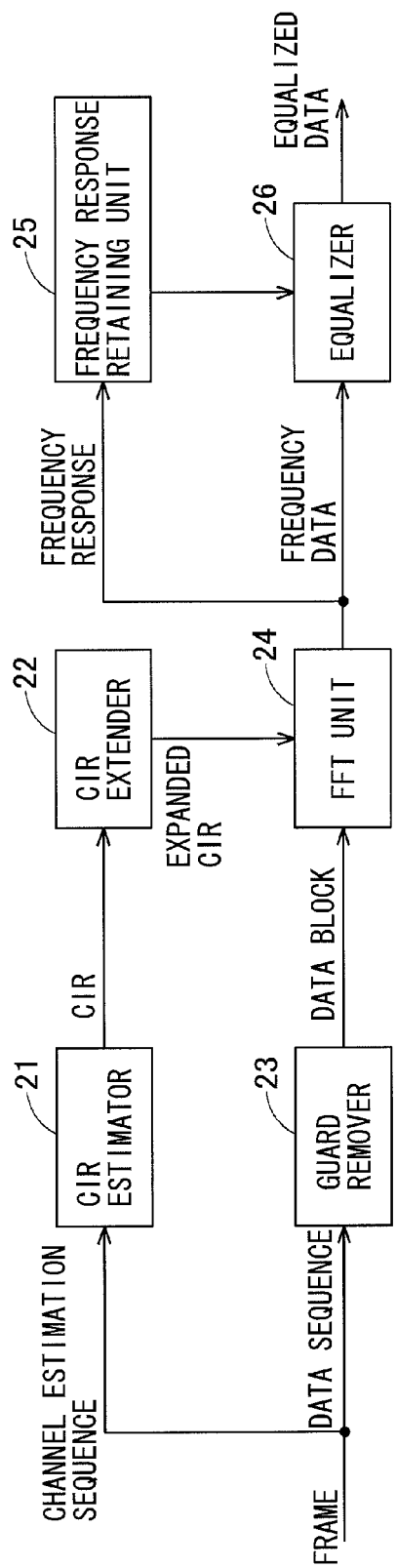
FIG. 3 is a block diagram showing an example of the internal structure of the information processor 1 shown in FIG. 1.

FIG. 3 is a block diagram showing an example of the internal structure of the information processor 1 shown in FIG. 1. The information processor 1 of FIG. 3 has a CIR estimator 21, a CIR extender 22, a guard remover 23, an FFT unit 24, a frequency response retaining unit 25, and an equalizer 26.

The CIR estimator 21 calculates channel impulse response (CIR) in a wireless propagation channel based on the channel estimation sequence included in the frame. More concretely, the CIR estimator 21 correlates a received channel estimation sequence with a known transmission channel estimation sequence to estimate CIR convolved with the transmission channel sequence. To obtain good autocorrelation properties, Complementary Golay sequence, M sequence, or Chu sequence, whose autocorrelation properties are impulsive or nearly impulse, is used as the channel estimation sequence.

Figure 4:
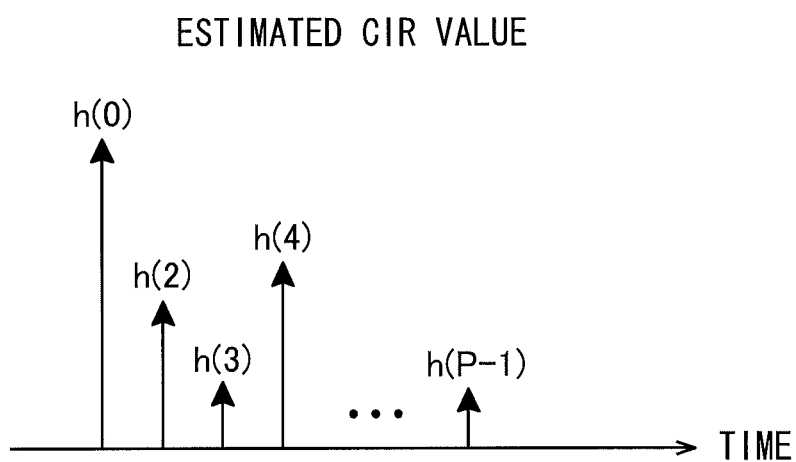
FIG. 4 is a diagram showing an example of estimated CIR.

FIG. 4 is a diagram showing an example of estimated CIR. As shown in FIG. 4, the CIR is discrete along the time axis, and can be expressed as a vector of length P, as shown in the following Formula (1).

$$\text{CIR vector } h = [h(0), h(1), h(2), \ldots, h(P-1)] \quad (1)$$

Normally, the maximum possible CIR length P is determined by signal bandwidth, expected propagation channel, communication distance, etc. in the design stage of the information processor 1. Here, it is assumed that the CIR length corresponds to maximally P symbols and this length is at least ½ or less of N symbols regarded as FFT size (data block length). This assumption is proper in most wireless communication systems, and the length of the guard interval shown in FIG. 2 often corresponds to P.

The CIR extender 22 calculates extended CIR of a length of N, the extended CIR consisting of the CIR vector h estimated by the CIR estimator 21 and zeros. In the extended CIR, a vector element [h, 0, 0, . . . , 0] consisting of h and zeros padded to have a length of N/Q is repeated Q times (Q is an integer of 2 or greater). The extended CIR can be expressed as vector g, as shown in the following Formula (2). In this specification, the vector element [h, 0, 0, . . . , 0] is referred to as an extended CIR element.

$$g = [\underbrace{\overbrace{h, 0, 0, \ldots, 0}^{P}, \overbrace{h, 0, 0, \ldots, 0}^{\frac{N}{Q}-P}, \ldots \overbrace{h, 0, 0, \ldots, 0}^{\frac{N}{Q}}}_{N}] \quad (2)$$

The relationship between the extended CIR and FFT will be explained in detail later. To calculate desired frequency response when inputting the extended CIR into an intermediate calculation stage of the FFT unit 24, the extended CIR is calculated using Q and data arrangement appropriate for the intermediate calculation stage. Further, as will be clear from Formula (2), the number of FFT points N, CIR length P, and Q should satisfy the relationship of Q≤N/P, which is derived from the fact that CIR length P is N/Q or less. Since Q is 2 or greater, Q should satisfy the relationship of 2≤Q≤N/P.

The extended CIR calculated by the CIR extender 22 is supplied to the FFT unit 24. The FFT unit 24 performs fast Fourier transform (FFT) using the extended CIR to calculate frequency response. The calculated frequency response is retained by the frequency response retaining unit 25. The equalizer 26 performs equalization on the data passed through frequency conversion performed by the FFT unit 24, using the frequency response retained by the frequency response retaining unit 25.

The present embodiment is characterized in that the FFT unit 24 optimized for performing frequency conversion on the data sequence is further used to calculate frequency response of the extended CIR. More specifically, in the present embodiment, desired frequency response can be calculated by inputting the extended CIR into the FFT unit 24 in the middle of calculation.

Figure 5:
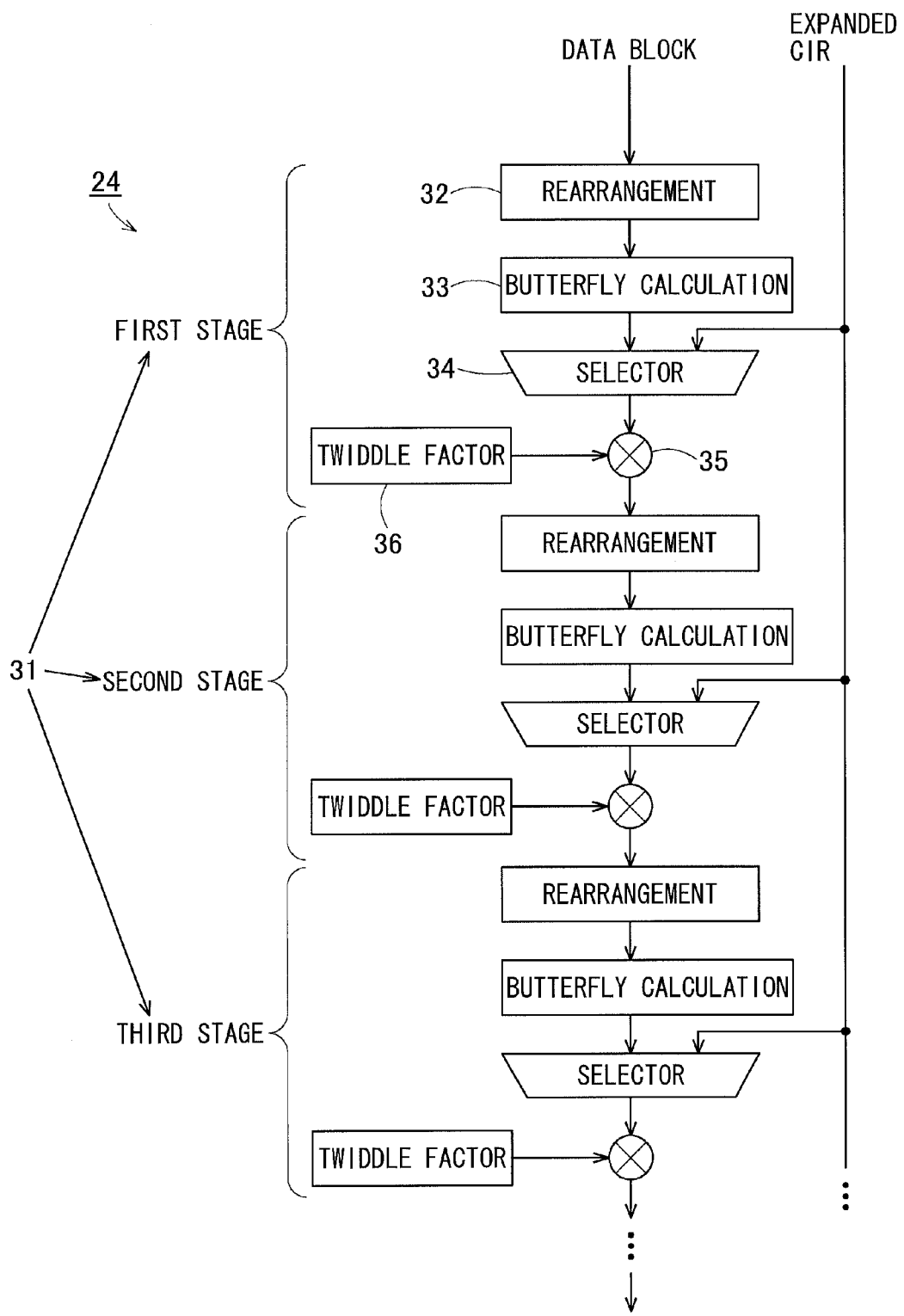
FIG. 5 is a block diagram showing a first example of the internal structure of an FFT unit 24.

FIG. 5 is a block diagram showing a first example of the internal structure of the FFT unit 24. The FFT unit 24 of FIG. 5 has a plurality of calculation stages 31 connected in cascade to calculate fast Fourier transform calculation stage by stage. Each of the calculation stages 31 has a rearrangement unit 32, a butterfly calculation unit 33, a selector 34, and a multiplier 35.

The rearrangement unit 32 rearranges input data of each calculation stage 31 in an appropriate order. The butterfly calculation unit 33 performs butterfly calculation. The selector 34 selects the output signal from the butterfly calculation unit 33 or the extended CIR. The multiplier 35 multiplies the output signal from the selector 34 by a twiddle factor 36 and inputs the result to the next calculation stage 31.

Only one of the selectors 34 of the respective calculation stages 31 selects the extended CIR. Each of the other selectors 34 selects the output signal from the butterfly calculation unit 33.

Figure 6:
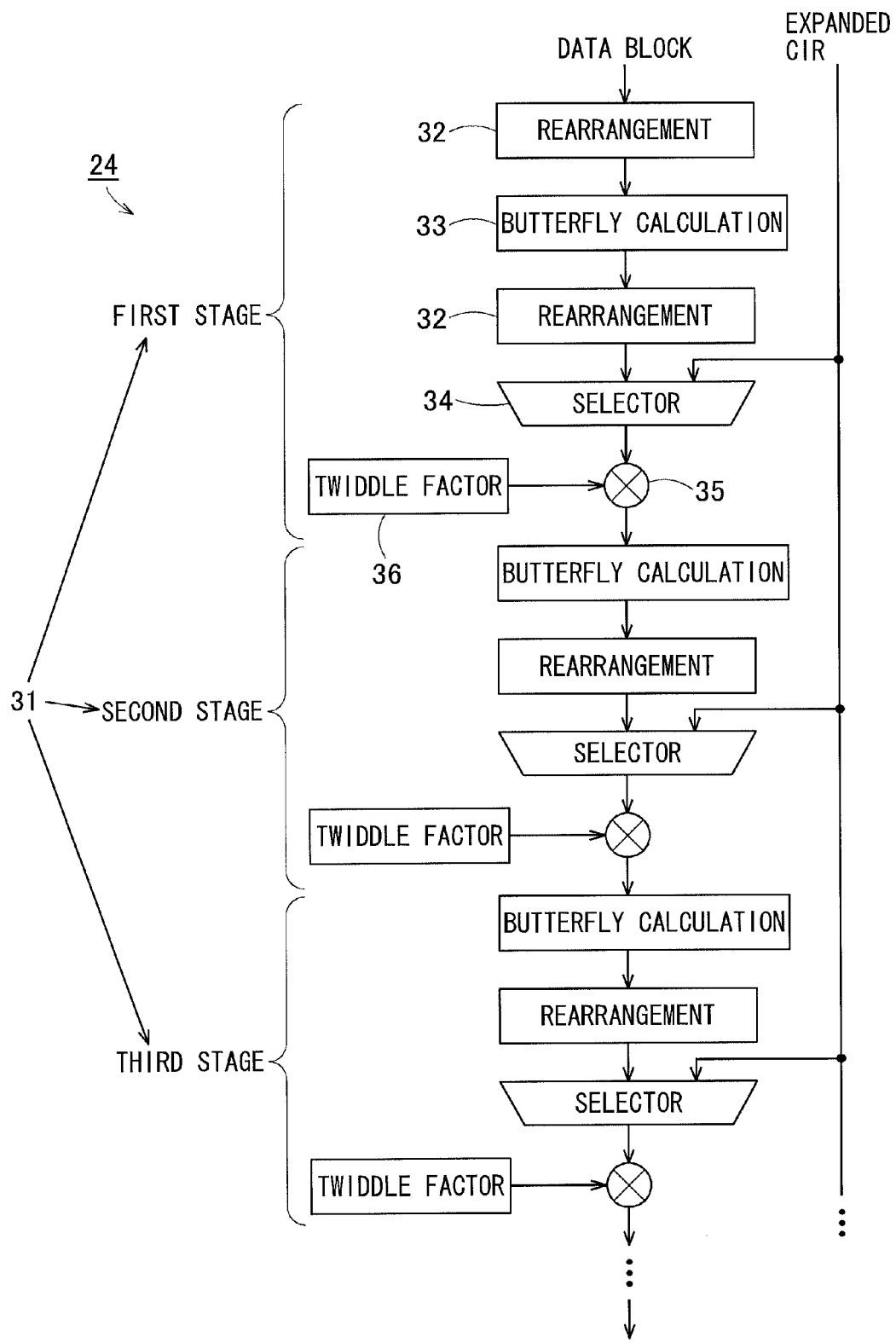
FIG. 6 is a block diagram showing a second example of the internal structure of the FFT unit 24.
Figure 7:
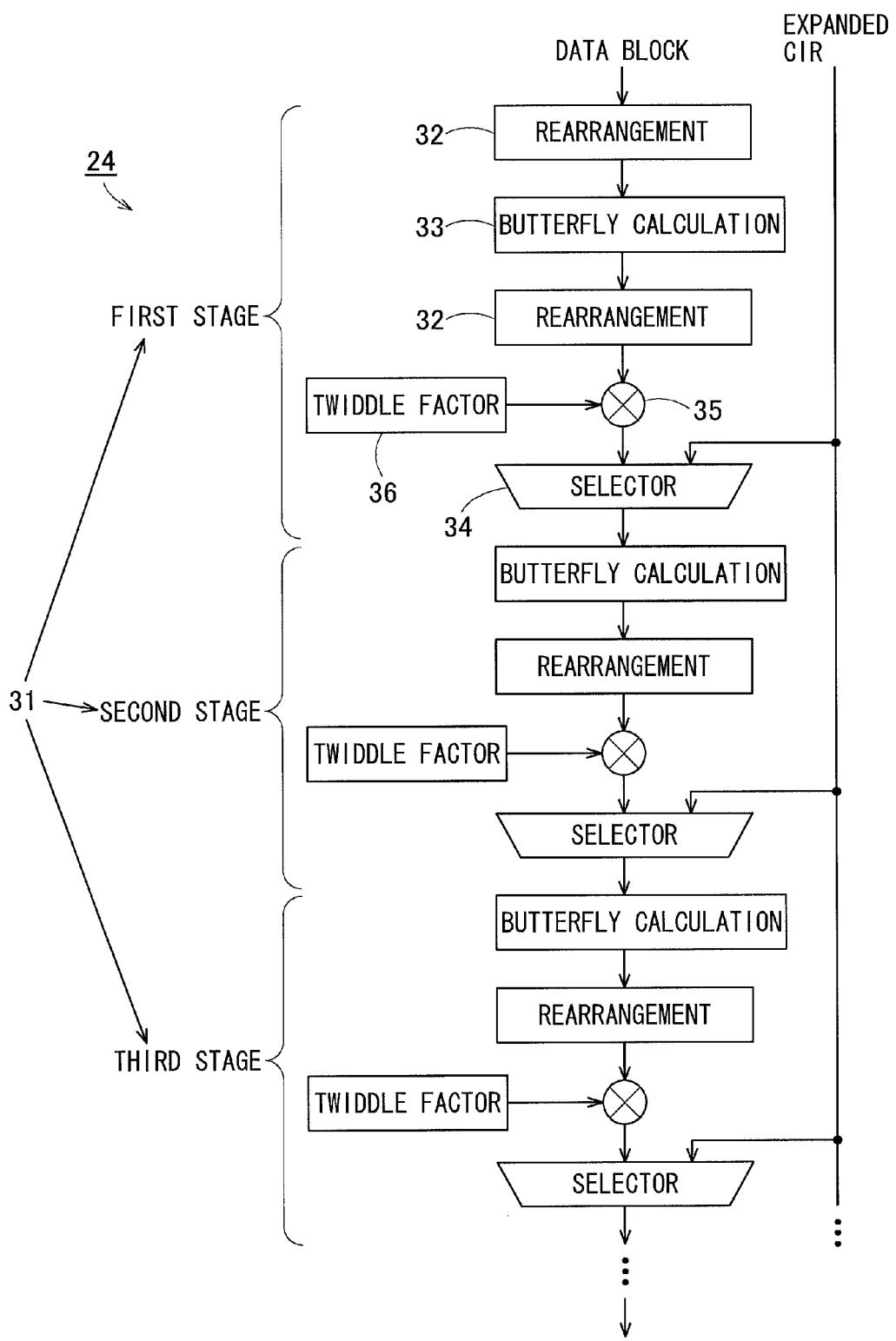
FIG. 7 is a block diagram showing a third example of the internal structure of the FFT unit 24.

The order of the steps performed by the respective units in the calculation stage 31 can be changed as shown in FIG. 6 and FIG. 7 for example.

FIG. 6 is a block diagram showing a second example of the internal structure of the FFT unit 24. The FFT unit 24 of FIG. 6 is different from the FFT unit 24 of FIG. 5 in the internal structure of the calculation stages 31. That is, in each calculation stage 31 of FIG. 6, the butterfly calculation unit 33, the rearrangement unit 32, the selector 34, and the multiplier 35 are arranged in this order.

In FIG. 6, the first calculation stage 31 has two rearrangement units 32. The former rearrangement unit 32 rearranges data blocks inputted in chronological order. The latter rearrangement unit 32 rearranges the data blocks passed through the calculation by the butterfly calculation unit 33, similarly to the rearrangement units 32 in the other calculation stages 31.

FIG. 7 is a block diagram showing a third example of the internal structure of the FFT unit 24. The FFT unit 24 of FIG. 7 is different from the FFT unit 24 of FIG. 5 and FIG. 6 in the internal structure of the calculation stages 31. That is, in each calculation stage 31 of FIG. 7, the butterfly calculation unit 33, the rearrangement unit 32, the multiplier 35, and the selector 34 are arranged in this order.

As stated above, FIGS. 5 to 7 are slightly different from one another in the internal structure of the calculation stages 31, but basically the same in the steps to be performed in the calculation stages 31. In each case, the FFT unit 24 calculates the frequency response by inputting the extended CIR to the calculation stage subsequent to the output node of the first calculation stage 31.

In the FFT unit 24 of FIG. 7, the selector 34 switches the output signal from the multiplier 35 in the calculation stage 31, and thus the selector 34 cannot be provided in the last calculation stage 31. Accordingly, when the FFT unit 24 of FIG. 7 has n calculation stages 31, the selectors 34 is provided in the first to (n−1)th calculation stages 31, which means that the number of calculation stages 31 having the selector 34 is smaller than that of the FFT unit 24 of FIG. 5 or FIG. 6 by one.

Here, when the FFT unit 24 of FIGS. 4 to 6 has S calculation stages 31, the relationship as shown in the following Formula (3) is established between the number of FFT points N calculated by the FFT unit 24 and radix R(n) (n=1, 2, . . . , S) of the butterfly calculation unit 33 in each calculation stage 31.

$$N=R(1) \times R(2) \times \ldots \times R(S) \quad (3)$$

Hereinafter, explanation will be given on the conditions for correctly calculating frequency response of CIR using the extended CIR and FFT in the information processor 1 according to the present embodiment. In order to correctly calculate the frequency response, the extended CIR shown in Formula (2) and the calculation stage 31 to be inputted with the extended CIR should satisfy specific conditions.

2, 4, or 8 is a butterfly radix most widely used in the calculation performed by the butterfly calculation unit 33 in each calculation stage 31, and generally all of S butterfly calculation units 33 or S−1 butterfly calculation units 33 use the same radix.

To calculate frequency response by inputting the extended CIR into the J-th calculation stage 31, Q in Formula (2) and butterfly radix R(n) (n=1, 2, . . . , J) in the first to J-th calculation stages 31 should satisfy the following Formula (4).

$$Q=R(1) \times R(2) \times \ldots \times R(J) \quad (4)$$

Hereinafter, operation of the FFT unit 24 according to the present embodiment will be explained using a more concrete implementation example. The FFT unit 24 shown in FIGS. 5 to 7 can be variously implemented in terms of the butterfly radix used in the calculation performed by the butterfly calculation unit 33, concrete configuration of the rearrangement unit 32, and the number of data items processed in parallel in each calculation stage 31, i.e., the number of circuits of the butterfly calculation unit 33 in each calculation stage 31. Hereinafter, a typical example will be explained.

Figure 8:
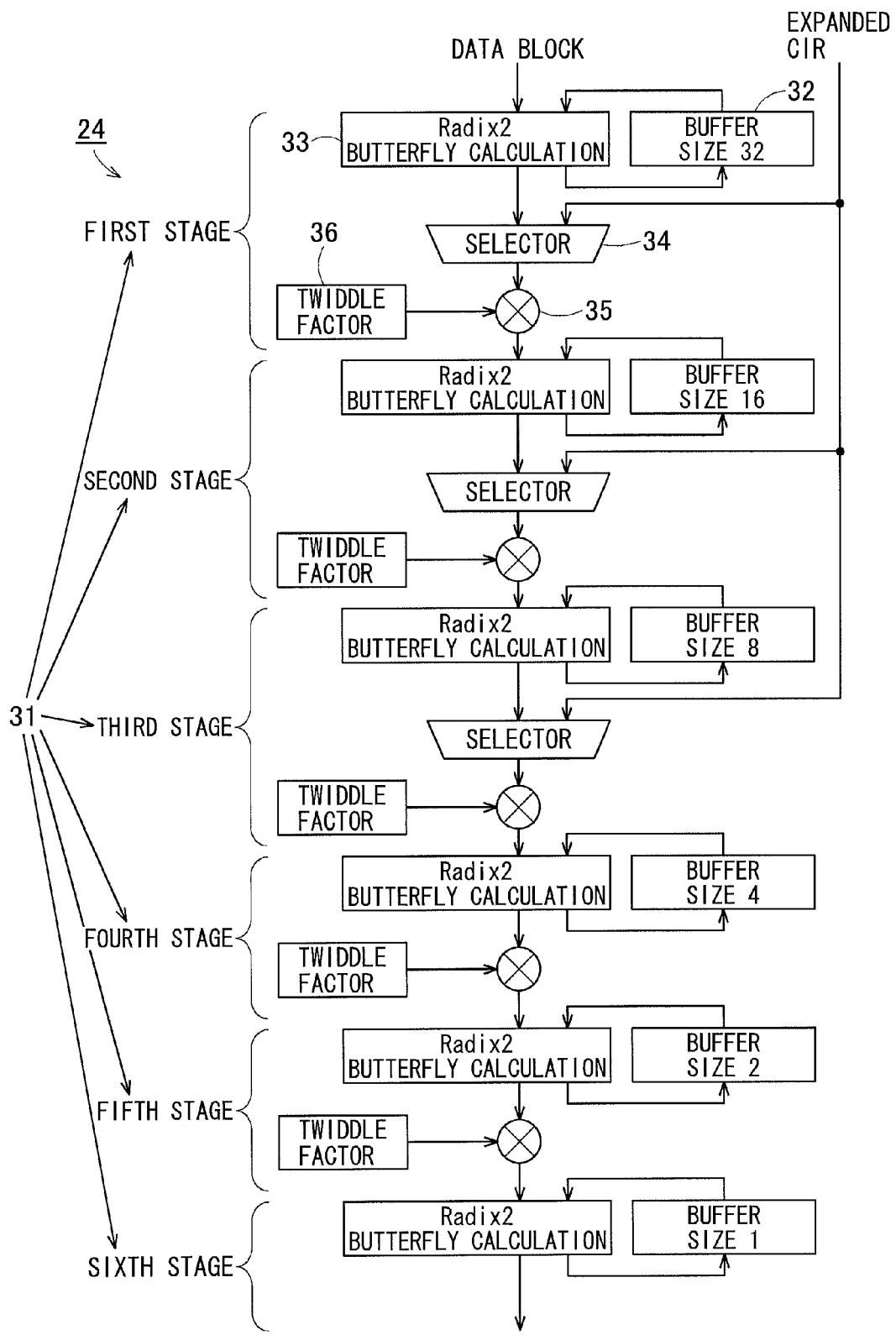
FIG. 8 is a block diagram showing a first example of a more concrete internal structure of the FFT unit 24.

FIG. 8 is a block diagram showing a first example of a more concrete internal structure of the FFT unit 24. This configuration is called R2SDF (Radix-2 Single Delay Feedback), and a buffer (FIFO) 37 in each calculation stage 31 realizes the process performed by the rearrangement unit 32 of FIGS. 5 to 7. In the FFT unit 24 of FIG. 8, the selector 34 is provided in the first to third calculation stages 31.

Note that the selector 34 should be provided in at least one calculation stage 31, and the type of the calculation stage 31 to be provided with the selector 34 is not particularly limited.

Referring to FIG. 8, the selector 34 in each of the first to third calculation stages 31 is arranged between the butterfly calculation unit 33 and the multiplier 35, which is a concrete version of FIG. 5.

Here, explanation will be given on an example where CIR length P=8. In this case, the maximum Q in Formula (2) is N/P=64/8=8.

Further, based on the relationship of Formula (4), any one of 2, 4, and 8 can be used as the value of Q, which corresponds to a case where the extended CIR is inputted into each of the first, second, and third calculation stages 31.

Hereinafter, explanation will be given on the fact that the result obtained by inputting the extended CIR into each calculation stage 31 is desired frequency response. Suppose a case similar to conventional examples, where extended CIR obtained by padding CIR with zeros to have a length of N, which is g when Q=1 in Formula (2), is inputted into FFT. In other words, suppose a case where the data block inputted into FFT in FIG. 8 can be expressed as the following Formula (5).

$$X = [X(0), X(1), \ldots , X(63)] = [\overset{8}{h}, \overset{56}{\overline{0, 0, \ldots , 0}}] \quad (5)$$

Output result Y from the Radix2 butterfly calculation unit 33 in the first calculation stage 31 can be expressed as the following Formula (6).

$$Y(n) = X(n) + X\left(n + \frac{N}{2}\right) = X(n) + X(n+32) \quad (6)$$

$$Y\left(n + \frac{N}{2}\right) = X(n) - X\left(n + \frac{N}{2}\right) = X(n) - X(n+32)$$

$$\left(n = 0, 1, 2, \ldots , \frac{N}{2} - 1\right)$$

Based on the above Formula (5), X(N/2) to X(N−1) are all 0s, Formula (6) leads to the following Formula (7).

$$Y = [Y(0), Y(1), \ldots , Y(63)] = [\overset{8}{h}, \overset{24}{\overline{0, 0, \ldots , 0}}, \overset{8}{h}, \overset{24}{\overline{0, 0, \ldots , 0}}] \quad (7)$$

In the first calculation stage 31, the twiddle factor 36 other than 1 is applied only to Y(48) to Y(63), which means that the output from the first calculation stage 31 is the same as Formula (7).

Output result Z from the second Radix2 butterfly calculation unit 33 can be expressed as the following Formula (8).

$$Z(n) = Y(n) + Y\left(n + \frac{N}{4}\right) = Y(n) + Y(n+16) \quad (8)$$

$$Z\left(n + \frac{N}{4}\right) = Y(n) - Y\left(n + \frac{N}{4}\right) = Y(n) - Y(n+16)$$

Note that, in Formula (8), n=aN/2+b, (a=0, 1, and b=0, 1, . . . , N/4−1). Considering the positions of 0s in the above Formula (7), the term of Y(n+N/4) in Formula (8) is filled with 0s, which means that Z can be expressed as the following Formula (9).

$$Z = [Z(0), Z(1), \ldots , Z(63)] = [\overset{8}{h}, \overset{8}{\overline{0, 0, \ldots , 0}}, \quad (9)$$
$$\overset{8}{h}, \overset{8}{\overline{0, 0, \ldots , 0}}, \overset{8}{h}, \overset{8}{\overline{0, 0, \ldots , 0}}, \overset{8}{h}, \overset{8}{\overline{0, 0, \ldots , 0}}]$$

In the second calculation stage 31, the twiddle factor 36 other than 1 is applied only to Z(24) to Z(31), Z(40) to Z(47), and Z(56) to Z(63), which means that the output from the butterfly calculation unit 33 in the second calculation stage 31 is the same as Formula (9).

Output result W from the third Radix2 butterfly calculation unit 33 can be expressed as the following Formula (10).

$$W(n) = Z(n) + Z\left(n + \frac{N}{8}\right) = Z(n) + Z(n+8) \quad (10)$$

$$W\left(n + \frac{N}{8}\right) = Z(n) - Z\left(n + \frac{N}{8}\right) = Z(n) - Z(n+8)$$

Note that, in Formula (10), n=aN/4+b, (a=0, 1, 2, 3, and b=0, 1, . . . , N/8−1). Similarly to the above, considering the positions of 0s in the above Formula (9), the term of Z(n+N/8) in Formula (10) is filled with 0s, which means that W can be expressed as the following Formula (11).

$$W = [W(0), W(1), \ldots, W(63)] = [\frac{8}{h}, \frac{8}{h}, \frac{8}{h}, \frac{8}{h}, \frac{8}{h}, \frac{8}{h}, \frac{8}{h}, \frac{8}{h}, \frac{8}{h}] \quad (11)$$

Further calculation is not simple enough to be expressed using only CIR(h) and 0 as in the above calculation. The maximum number of calculation stages is as shown in Formula (4).

Referring to Formula (7), Formula (9), and Formula (11), output data Y, Z, and W from the butterfly calculation units 33 in the first to third calculation stages 31 are the same as Q (=2, 3, 4) in the extended CIR shown in Formula (2). In other words, in the configuration of FIG. 7, frequency response of CIR can be calculated by inputting the extended CIR into an intermediate calculation stage 31 of the FFT unit 24. Here, FFT based on R2SDF of 64 points is explained as an example, but it is clear that frequency response of CIR can be calculated also when using another configuration as shown in FIG. 5 and FIG. 6.

Figure 9:
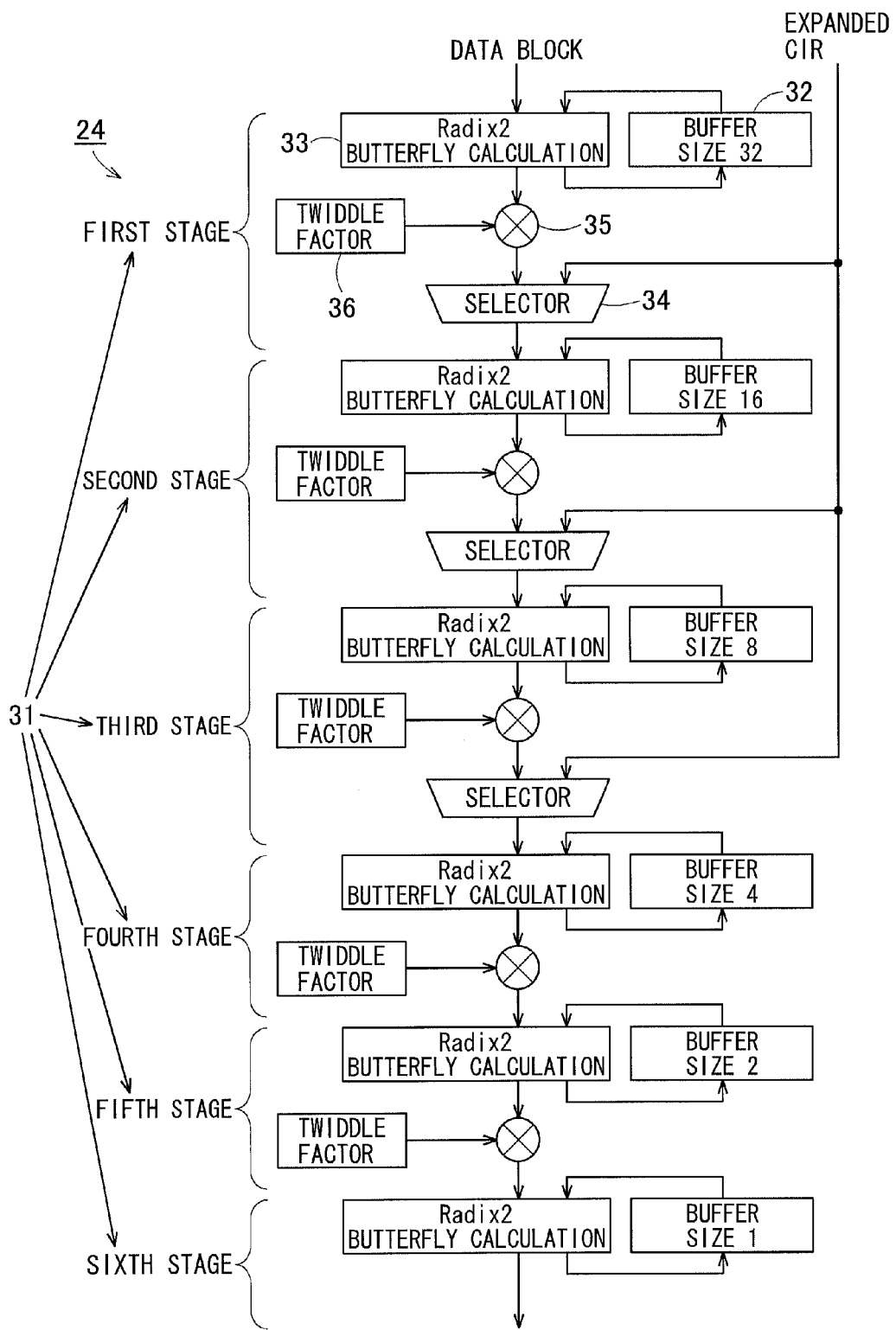
FIG. 9 is a block diagram showing a second example of a more concrete internal structure of the FFT unit 24.

On the other hand, FIG. 9 is a block diagram showing a second example of a more concrete internal structure of the FFT unit 24.

The FFT unit 24 of FIG. 9 is different from the FFT unit 24 of FIG. 8 in the order of the steps to be performed by the respective units in the calculation stage 31, but the same in basic operation.

In FIG. 8, the selector 34 in each of the first to third calculation stages 31 is arranged between the butterfly calculation unit 33 and the multiplier 35. On the other hand, in FIG. 9, the selector 34 in each of the first to third calculation stages 31 is arranged between the multiplier 35 and the butterfly calculation unit 33 in the next calculation stage 31. The FFT unit 24 of FIG. 8 is a more concrete version of FIG. 5, while the FFT unit 24 of FIG. 9 is a more concrete version of FIG. 6.

Under the conditions similar to the example of FIG. 8, the operation of the third butterfly calculation unit 33 in the FFT unit 24 of FIG. 9 can be similarly expressed as Formula (11). Note that the extended CIR is inputted into the third calculation stage 31 after multiplication using the twiddle factor 36 is performed by the multiplier 35 in the third calculation stage 31. Since the twiddle factor 36 in the third calculation stage 31 includes a value other than 1, Formula (11) when multiplied by the twiddle factor 36 cannot be expressed using only CIR(h) and 0 anymore. In other words, in this example, the extended CIR can be inputted only into the first to second calculation stages.

As explained above, frequency response can be calculated using the FFT unit 24 optimized for the data sequence. Correctly, when there is no quantization error, frequency response in the present embodiment is similar to that in conventional examples. When each data item is formed having a certain bit width, quantization errors can be reduced by calculating frequency response using the present embodiment. Therefore, the present embodiment is effective particularly when minimizing the FFT bit width to reduce power consumption.

Suppose a case where each sample of data inputted into FET has a bit width of A. In other words, in conventional examples, h is represented as A bits. In FIG. 7, the Radix2 butterfly calculation unit 33 in the first calculation stage outputs Y after performing one-time addition/subtraction, to obtain A+1 bits. However, as will be clear from Formula (6), in which only 0s are added, MSB value in Y has no meaning, and the number of significant bits of h remains A.

In the example shown in FIG. 8, the extended CIR can be inputted directly into the first calculation stage when the bit width is A+1 bits, and thus the number of significant bits of h is A+1, which makes it possible to reduce quantization error. If completely the same calculation as in conventional examples is required in the present embodiment, h is expressed as A bits and the extended CIR is inputted to A bits on the LSB side. Similar effect can be obtained also when inputting the extended CIR into the second and subsequent calculation stages. Also in the example shown in FIG. 9, it is clear that bit width when inputting the extended CIR can be increased compared to conventional examples.

In generally implemented FFT, bit width increased due to addition and multiplication in FFT is reduced in a certain stage by performing rounding or overflow processing, but the bit width does not become smaller than the input bit width of FFT. Therefore, when FFT is generally implemented, the present embodiment makes it possible to calculate frequency response of CIR with higher accuracy.

That is, according to the present embodiment, even when bit width is extended due to the calculation performed by the butterfly calculation unit 33 in an arbitrary calculation stage 31, the extended CIR having a bit width corresponding to the extended bit width can be inputted into the FFT unit 24, which makes it possible to calculate frequency response without deteriorating bit precision.

The elements of the extended CIR shown in Formula (2) can be rearranged in an arbitrary order corresponding to the rearrangement units 32 shown in FIGS. 5 to 7. The order of the elements of the extended CIR based on Formula (2) can be changed when the FFT unit 24 has an arbitrary configuration in which the vector obtained by padding CIR with zeros as shown in Formula (5) is inputted into the data block path of the FFT unit 24.

How to determine the calculation stage 31 to be inputted with the extended CIR will be explained below. As shown in the above Formulas (2) to (4), in the present embodiment, desired frequency response can be calculated by the FFT unit as long as a condition of Q≤N/P is satisfied, by calculating the extended CIR and inputting it into its corresponding calculation stage 31.

Note that when the FFT unit has a general circuit configuration, input/output bit width and internal bit width are fixed, and monotonic increase in the bit width for completely preventing the increase in quantization error is not realized, which means that quantization error in the output from the FFT unit differs depending on the calculation stage 31 inputted with the extended CIR. In other words, the calculation stage 31 to be inputted with the extended CIR should be determined to minimize quantization error and distortion due to signal clipping in the frequency response calculated using the extended CIR.

In a general wireless communication system, power of the frames to be received is kept at a constant level based on gain control performed by VGA (Variable Gain Amplifier) etc. In this case, gain control is performed so that sum of squares of each element included in the data block of the frame becomes almost constant while reducing quantization error and distortion due to signal clipping in the output when performing FFT processing on the data block.

When performing FFT processing on the data block, an input value of the j-th selector 34 is defined as D(j)=[d(j, 0), d(j, 1), d(j, 2), . . . , d(j, N−1)], and the average value or expected value of sum of squares of the value is defined as Pd(j), which leads to the following formula.

$$P_d(j) = E\left[\sum_{n=0}^{N-1} |d(j,n)|^2\right] \quad (12)$$

Note that E[x] represents the average value or expected value of x, and each element in D(j) is a quantized signed integer. When performing gain control, the value of Pd(j) can be regarded as a constant determined depending on the circuit configuration of the FFT unit and the target value of gain control.

On the other hand, suppose a case where the extended CIR is inputted into the j-th calculation stage 31, which is, i.e., the position of D(j). When the calculated value of the extended CIR in this case is defined as g(j)=[g(j, 0), g(j, 1), g(j, 2), ..., g(j, N−1)], the average value or expected value Pg(j) of sum of squares of g(j) is defined as follows.

$$P_g(j) = E\left[\sum_{n=0}^{N-1} |g(j,n)|^2\right] \quad (13)$$

Similarly to Formula (12), each element of g(j) is a quantized signed integer.

In such a case, when Pg(j) and Pd(j) are close values, distortion in the frequency response of FFT output is reduced. Since the increase by 1 bit quadruplicates the value of Formulas (12) to (13), a condition that Pg(j) and Pd(j) have close values can be expressed as the following Formula (14).

$$0.5Pd(j) \leq Pg(j) \leq 2Pd(j) \quad (14)$$

Alternatively, the following Formula (15) can be employed as a loosened condition, instead of Formula (14).

$$0.25Pd(j) \leq Pg(j) \leq 4Pd(j) \quad (15)$$

In other words, frequency response can be calculated with high accuracy by inputting the extended CIR into the j-th calculation stage 31 so that j becomes the maximum while satisfying Formula (14) or (15), Formulas (2) to (4), and the condition of Q≤N/P.

Note that the bit width of g(j) should be the same as the bit width of D(j). Thus, when the bit width of D(j) is larger than the bit width of h in Formula (1), 0 should be inserted on the LSB side to perform scaling appropriately. On the other hand, when the bit width of h is smaller than the bit width of D(j), the LSB side should be rounded off to adjust the bit width.

Further, in the present embodiment, when inputting the extended CIR into an intermediate calculation stage 31 of a plurality of calculation stages 31, frequency response can be calculated while stopping the operation of the previous calculation stage 31. This makes it possible to reduce power consumption when calculating the frequency response. For example, when the extended CIR is inputted into the j-th calculation stage 31, clock supply to the first to J−1th calculation stages 31 of the FFT unit 24 is stopped to forcibly stop the operation of these calculation stages 31.

Further, processing latency required to calculate frequency response can be reduced by inputting the extended CIR into an intermediate calculation stage 31 of a plurality of calculation stages 31 as in the present embodiment.

The frequency response of CIR calculated using the above technique is retained by the frequency response retaining unit 25 shown in FIG. 3.

On the other hand, in the data sequence included in an inputted frame, guard intervals are removed by the guard remover 23 and data blocks are inputted into the FFT unit 24. The FFT unit 24 performs Fourier transform on the data block consisting of N symbols to calculate frequency data. Differently from the extended CIR, the data block goes through normal FFT processing, and thus the data block consisting of N symbols is inputted directly to the FFT unit 24.

The data block consisting of N symbols may correspond to N data symbols in the single carrier system, N samples sampled at a speed faster than the symbol rate in the single carrier system, or N samples equivalent to 1 OFDM symbol in the OFDM system.

The equalizer 26 performs equalization for removing distortion from the propagation channel, using the frequency data calculated by the FFT unit 24 and the frequency response of CIR retained by the frequency response retaining unit 25. The equalizer 26 performs equalization based on principle such as ZF (Zero Forcing) and MMSE (Minimum Mean Square Error).

When frequency data in the n-th bin is defined as R(n) and CIR frequency response is defined as H(n), MMSE equalization can be expressed as follows.

$$S(n) = \frac{H^*(n)R(n)}{|H(n)|^2 + \sigma^2} \quad (16)$$

Note that $\sigma^2$ means noise dispersion defined by the signal-to-noise power ratio of the received frame. In the above formula, ZF corresponds to $\sigma^2$ having a value of 0. The process to be performed after the equalization is not a characterizing part of the present embodiment, and thus detailed explanation thereof will be omitted. For example, in the case of single carrier system, the equalized data is restored to time axis data by Inverse Fast Fourier Transform processing and further restored to transmission data by data demodulation/decoding process. Further, in the case of OFDM system, data demodulation/decoding process is performed on the equalized data to restore transmission data.

As stated above, in the present embodiment, one type of FFT unit 24 functions both as FFT for processing data blocks and as FFT for calculating frequency response of channel impulse response (CIR). By extending CIR and inputting the extended CIR into an intermediate calculation stage 31 in the FFT unit 24, frequency response of high quality can be generated and used for equalization.

As stated above, in the present embodiment, frequency response is calculated by inputting the extended channel impulse response into an optimum calculation stage 31 in the FFT unit 24, which makes it possible to calculate frequency response with high accuracy by using the FFT unit 24 optimized for data blocks. This eliminates the need to provide two types of FFTs, which leads to the reduction in circuit area.

Further, according to the present embodiment, the operation of the FFT unit 24 can be partially stopped when calculating frequency response of the extended channel impulse response, which leads to the reduction in power consumption.

Furthermore, according to the present embodiment, processing delay required for calculating frequency response of the extended channel impulse response can be reduced.

At least a part of the information processor explained in the above embodiments may be formed of hardware or software. In the case of software, a program realizing at least a partial function of the information processor may be stored in a recording medium such as a flexible disc, CD-ROM, etc. to be read and executed by a computer. The recording medium is not limited to a removable medium such as a magnetic disk, optical disk, etc., and may be a fixed-type recording medium such as a hard disk device, memory, etc.

Further, a program realizing at least a partial function of the information processor can be distributed through a communication line (including radio communication) such as the Internet. Furthermore, this program may be encrypted, modulated, and compressed to be distributed through a wired line or a radio link such as the Internet or through a recording medium storing it therein.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An information processor comprising:
a CIR estimator to estimate channel impulse response of an input signal including a channel estimation sequence and a data sequence, based on the channel estimation sequence;
an extended CIR calculator to calculate extended channel impulse response based on the channel impulse response estimated by the CIR estimator so that an extended CIR element padded with zeros is repeated a plurality of times in the extended channel impulse response;
a Fourier transformer to convert the data sequence of the input signal into a frequency domain signal to calculate frequency response based on the extended channel impulse response; and
an equalizer to perform equalization for removing a distortion from a propagation channel, based on the frequency domain signal and the frequency response,
wherein the Fourier transformer has a plurality of calculation stages connected in cascade to calculate fast Fourier transform stage by stage, and
the Fourier transformer calculates the frequency response by inputting the extended channel impulse response calculated by the extended CIR calculator into a calculation stage subsequent to an output node of a first calculation stage.

2. The information processor of claim 1,
wherein each of the calculation stages of the Fourier transformer has a bit width optimized to perform frequency conversion on the data sequence.

3. The information processor of claim 1,
wherein each of the calculation stages comprises a butterfly calculation unit, and
when the number of the calculation stages is n (n is an integer of 2 or greater) and the butterfly calculation unit in a k-th stage (k is an integer equal to or greater than 1 but equal to or less than n) uses a radix of $R(k)$,
the Fourier transformer calculates the frequency response by inputting the extended channel impulse response into the calculation stage so that the input is received between an output node of the butterfly calculation unit in a j-th stage (j is an integer equal to or greater than 1 but equal to or less than n) and an input node of the butterfly calculation unit in a (j+1)th stage, and the number of repetitions Q for the extended CIR calculator is expressed as follows:

$$Q=R(1) \times R(2) \times \ldots \times R(j).$$

4. The information processor of claim 3,
wherein when the number of points in the fast Fourier transform performed by the Fourier transformer is N and the channel impulse response has a length of P, the number of repetitions Q for the extended CIR calculator is an integer which is equal to or greater than 2 but equal to or less than N/P.

5. The information processor of claim 3,
wherein when calculating the frequency response, the Fourier transformer stops operation of the first to (j−1)th calculation stages and activates the j-th and subsequent calculation stages to calculate the frequency response.

6. The information processor of claim 1,
wherein bit width of the extended channel impulse response is larger than bit width of an input node of the Fourier transformer.

7. The information processor of claim 1,
wherein when a value of the data sequence is inputted into the j-th (j is an integer equal to or greater than 1 but equal to or less than n) calculation stage defining that an average value or an expected value of sum of squares of the value is $Pd(j)$, and the extended channel impulse response is inputted into the j-th calculation stage defining that an average value or an expected value of sum of squares of the extended channel impulse response is $Pg(j)$, the value of j is determined to satisfy the following condition:

$$0.25 Pd(j) \leq Pg(j) \leq 4 Pd(j).$$

8. The information processor of claim 1,
wherein each of the calculation stages comprises a butterfly calculation unit, and
each of at least one or more calculation stages in the calculation stages comprises a selector to select a value calculated by the corresponding butterfly calculation unit or the extended channel impulse response.

9. The information processor of claim 8,
wherein when the Fourier transformer comprises a plurality of selectors, and only any one of the selectors can select the extended channel impulse response.

10. A receiver comprising:
a wireless unit to convert a high-frequency signal received by an antenna into a baseband signal;
an A/D converter to convert the baseband signal into a digital signal;
a preamble processor to perform synchronous processing and gain adjustment, based on a preamble of each frame in the digital signal;
an information processor to perform equalization using the each frame in the digital signal as an input signal; and
a decoder to decode a signal passed through the equalization,
wherein the information processor comprises:
a CIR estimator to estimate channel impulse response of the input signal including a channel estimation sequence and a data sequence, based on the channel estimation sequence;
an extended CIR calculator to calculate extended channel impulse response based on the channel impulse response estimated by the CIR estimator so that an extended CIR element padded with zeros is repeated a plurality of times in the extended channel impulse response;

a Fourier transformer to convert the data sequence of the input signal into a frequency domain signal to calculate frequency response based on the extended channel impulse response; and an equalizer to perform equalization for removing a distortion from a propagation channel, based on the frequency domain signal and the frequency response, wherein the Fourier transformer has a plurality of calculation stages connected in cascade to calculate fast Fourier transform stage by stage, and the Fourier transformer calculates the frequency response by inputting the extended channel impulse response calculated by the extended CIR calculator into a calculation stage subsequent to an output node of a first calculation stage.

11. The receiver of claim 10,
wherein each of the calculation stages of the Fourier transformer has a bit width optimized to perform frequency conversion on the data sequence.

12. The receiver of claim 10,
wherein each of the calculation stages comprises a butterfly calculation unit, and
when the number of the calculation stages is n (n is an integer of 2 or greater) and the butterfly calculation unit in a k-th stage (k is an integer equal to or greater than 1 but equal to or less than n) uses a radix of R(k),
the Fourier transformer calculates the frequency response by inputting the extended channel impulse response into the calculation stage so that the input is received between an output node of the butterfly calculation unit in a j-th stage (j is an integer equal to or greater than 1 but equal to or less than n) and an input node of the butterfly calculation unit in a (j+1)th stage, and
the number of repetitions Q for the extended CIR calculator is expressed as follows:

$$Q = R(1) \times R(2) \times \ldots \times R(j).$$

13. The receiver of claim 12,
wherein when the number of points in the fast Fourier transform performed by the Fourier transformer is N and the channel impulse response has a length of P, the number of repetitions Q for the extended CIR calculator is an integer which is equal to or greater than 2 but equal to or less than N/P.

14. The receiver of claim 12,
wherein when calculating the frequency response, the Fourier transformer stops operation of the first to (j−1)th calculation stages and activates the j-th and subsequent calculation stages to calculate the frequency response.

15. The receiver of claim 10,
wherein bit width of the extended channel impulse response is larger than bit width of an input node of the Fourier transformer.

16. The receiver of claim 10,
wherein when a value of the data sequence is inputted into the j-th (j is an integer equal to or greater than 1 but equal to or less than n) calculation stage defining that an average value or an expected value of sum of squares of the value is Pd(j), and the extended channel impulse response is inputted into the j-th calculation stage defining that an average value or an expected value of sum of squares of the extended channel impulse response is Pg(j), the value of j is determined to satisfy the following condition:

$$0.25 Pd(j) \leq Pg(j) \leq 4 Pd(j).$$

17. The receiver of claim 10,
wherein each of the calculation stages comprises a butterfly calculation unit, and
each of at least one or more calculation stages in the calculation stages comprises a selector to select a value calculated by the corresponding butterfly calculation unit or the extended channel impulse response.

18. The receiver of claim 17,
wherein when the Fourier transformer comprises a plurality of selectors, and only any one of the selectors can select the extended channel impulse response.

19. An information processing method, comprising:
estimating channel impulse response of an input signal including a channel estimation sequence and a data sequence, based on the channel estimation sequence;
calculating extended channel impulse response based on the estimated channel impulse response so that an extended CIR element padded with zeros is repeated a plurality of times in the extended channel impulse response;
converting the data sequence of the input signal into a frequency domain signal to calculate frequency response based on the extended channel impulse response; and
performing equalization for removing a distortion from a propagation channel, based on the frequency domain signal and the frequency response,
wherein the converting the data sequence of the input signal into a frequency domain signal to calculate frequency response based on the extended channel impulse response is performed using a plurality of calculation stages connected in cascade to calculate fast Fourier transform stage by stage, and the frequency response is calculated by inputting the calculated extended channel impulse response into a calculation stage subsequent to an output node of a first calculation stage.

20. The information processing method of claim 19,
wherein the plurality of calculation stages includes a calculation stage having a bit width optimized to perform frequency conversion on the data sequence.

* * * * *